(12) United States Patent
Chung et al.

(10) Patent No.: US 8,595,527 B2
(45) Date of Patent: Nov. 26, 2013

(54) METHOD OF MANAGING POWER OF MULTI-CORE PROCESSOR, RECORDING MEDIUM STORING PROGRAM FOR PERFORMING THE SAME, AND MULTI-CORE PROCESSOR SYSTEM

(75) Inventors: Ki-Seok Chung, Seoul (KR); Young-Si Hwang, Gyeonggi-do (KR)

(73) Assignee: Postech Academy—Industry Foundation, Gyeongbuk (KR)

( * ) Notice: Subject to any disclaimer, the term of this patent is extended or adjusted under 35 U.S.C. 154(b) by 766 days.

(21) Appl. No.: 12/756,715

(22) Filed: Apr. 8, 2010

(65) Prior Publication Data
US 2011/0161636 A1    Jun. 30, 2011

(30) Foreign Application Priority Data
Dec. 24, 2009   (KR) .............................. 2009-0130316

(51) Int. Cl.
*G06F 1/00* (2006.01)
(52) U.S. Cl.
USPC .......................................... 713/322; 713/600
(58) Field of Classification Search
USPC ........................... 713/300, 322, 323, 324, 600
See application file for complete search history.

(56) References Cited

U.S. PATENT DOCUMENTS

| | | | |
|---|---|---|---|
| 6,230,313 B1* | 5/2001 | Callahan et al. | 717/128 |
| 8,081,191 B2* | 12/2011 | Saleem et al. | 345/505 |
| 2006/0005056 A1* | 1/2006 | Nishioka | 713/300 |
| 2006/0095807 A1* | 5/2006 | Grochowski et al. | 713/324 |
| 2007/0255929 A1 | 11/2007 | Kasahara et al. | |
| 2008/0034236 A1* | 2/2008 | Takayama et al. | 713/322 |
| 2008/0201591 A1* | 8/2008 | Hu et al. | 713/323 |
| 2009/0210740 A1* | 8/2009 | Huang et al. | 713/502 |
| 2011/0145615 A1* | 6/2011 | Rychlik et al. | 713/323 |
| 2011/0197195 A1* | 8/2011 | Cai et al. | 718/102 |
| 2011/0296212 A1* | 12/2011 | Elnozahy et al. | 713/320 |
| 2012/0131366 A1* | 5/2012 | Rakvic et al. | 713/320 |

FOREIGN PATENT DOCUMENTS

KR      20070061795 A      6/2007

* cited by examiner

*Primary Examiner* — Khanh Dang
(74) *Attorney, Agent, or Firm* — Osha Liang LLP

(57) ABSTRACT

Provided are a method of managing power of a multi-core processor, a recording medium storing a program for performing the method, and a multi-core processor system. The method of managing power of a multi-core processor having at least one core includes determining a parallel-processing section on the basis of information included in a parallel-processing program, collecting information for determining a clock frequency of the core in the determined parallel-processing section according to each core, and then determining the clock frequency of the core on the basis of the collected information. Accordingly, it is possible to minimize power consumption while ensuring quality of service (QoS).

9 Claims, 5 Drawing Sheets

METHOD OF MANAGING POWER OF MULTI-CORE PROCESSOR, RECORDING MEDIUM STORING PROGRAM FOR PERFORMING THE SAME, AND MULTI-CORE PROCESSOR SYSTEM

CROSS-REFERENCE TO RELATED APPLICATIONS

This application claims priority to Korean Patent Application No. 2009-0130316 filed on Dec. 24, 2009 in the Korean Intellectual Property Office (KIPO), the entire contents of which are hereby incorporated by reference.

BACKGROUND OF INVENTION

1. Technical Field

Example embodiments of the present invention relate in general to a multi-core processor and more specifically to a method of managing power of a multi-core processor, a recording medium storing a program for performing the method, and a multi-core processor system.

2. Related Art

In recent design and management of computer systems, not only computer performance but also power and energy have been main concerns. In particular, energy efficiency is important for portable devices or embedded systems.

Most portable devices and embedded systems operate on batteries and thus require more efficient power management than tethered devices that can be connected to a main power supply.

For example, a system with high power consumption emits a large amount of heat. Thus, the system needs to use an expensive packaging material, and may require a heat sink, which may result in increases in volume and production cost.

Dynamic voltage frequency scaling (DVFS), which is a power management technique for reducing power and energy consumption, provides a method of reducing power consumption of a microprocessor and related circuit by adjusting the supply voltage and clock frequency of a system. DVFS has a quadratic equation between a supply voltage and energy consumption, and analyzes use rates and power consumptions of a system according to several DVFS configurations to enable manufacturing of a scheduler for the DVFS technique needed to reduce power consumption, so that a device using a battery having a limited capacity can have more available power.

A multi-core processor having a plurality of cores drives at least one core to process the process of an application. At this time, when the use rate of processor resources (i.e., a time period during which the processor is occupied) required by the process is not 100%, only process performance required by the process is ensured using the DVFS technique to prevent use of unnecessary resources and reduce power consumption.

However, when a point in time at which an executed process must be finished (process deadline) is not accurately estimated, the general DVFS technique cannot ensure quality of service (QoS) of an application.

FIG. 1 is a graph illustrating power consumption when power of a processor is not managed, and FIG. 2 is a graph illustrating a case in which power of a processor is managed to prevent unnecessary power consumption.

Referring to FIGS. 1 and 2, power consumption can be briefly classified into static power consumption and dynamic power consumption. Static power consumption denotes a state in which since a process is not allocated to a core of a processor, the core is not driven but is supplied with and consumes power. Dynamic power consumption denotes a state in which a process is allocated to a core, and the core consumes power.

In general, a program code executed in the static power consumption state requests less than about 3% of resources from the kernel code of an operating system. However, in the graph shown in FIG. 1, 100% of resources are allocated, and unnecessary power is consumed.

Also, a dynamic power consumption section is in proportion with the number of tasks that should be processed by one process. When there is an interval between dynamic power consumption sections as shown in FIG. 1, an idle process occupies a core, and unnecessary power is consumed.

In FIG. 1, assuming that each block denoting a dynamic power consumption section is one process, the start time of each block is the start time of a process. Thus, when resources are set so that a currently performed dynamic power consumption block is finished by the start time of the next dynamic power consumption block, power consumption can be minimized by dynamically adjusting performance of a core.

In other words, when the performance of a core is dynamically adjusted by DVFS so that there is no static power consumption section between dynamic power consumption sections as shown in FIG. 2, it is possible to prevent unnecessary power consumption caused by an idle process occupying a core.

FIG. 3 is a graph showing the result of performing power management using a conventional power management method, in which a processor use rate obtained when on-demand power management is performed in an environment in which a specific application is executed is compared to a processor use rate obtained when no power management is performed.

In the graph of FIG. 3, an abscissa denotes time, and an ordinate denotes processor use rate of a user and/or a system.

In on-demand power management, control of a processor core is determined upon a specific use rate of a processor. For example, if control is performed at a use rate of 80%, performance of a core occupied by the process of an application is lowered by one level when the processor use rate is less than 80%. On the other hand, when the processor use rate is 80% or more, a DVFS setting is raised by one level to improve performance of the core.

However, the on-demand method cannot ensure a process deadline and thus is not appropriate for DVFS power management.

As shown in FIG. 3, when control is performed upon the processor use rate of 80%, the use rate of a processor core is evaluated to be less than 80% at eight seconds. Thus, performance of the activated core is lowered, and the execution time of a current process is delayed beyond the execution start time of the next process.

Referring to FIG. 3, when no control is performed (No Policy), the execution time of a process is 13 seconds. On the other hand, in the case of the on-demand method, the execution time of a process is 17 seconds, which is delayed for four seconds. Furthermore, when the delay of such a process execution time is accumulated, the overall performance of a system deteriorates.

SUMMARY OF INVENTION

Accordingly, example embodiments of the present invention are provided to substantially obviate one or more problems due to limitations and disadvantages of the related art.

Example embodiments of the present invention provide a method of managing power of a multi-core processor capable of reducing power consumption and ensuring quality of service (QoS).

Example embodiments of the present invention also provide a recording medium storing a program for executing the power management method.

Example embodiments of the present invention also provide a multi-core processor system for executing the power management method.

In some example embodiments, a method of managing power of a multi-core processor having at least one core includes: determining a parallel-processing section on the basis of information included in a parallel-processing program; collecting information for determining a clock frequency of the core in the determined parallel-processing section according to each core; and determining the clock frequency of the core on the basis of the collected information. Determining the parallel-processing section on the basis of information included in a parallel-processing program may include determining the parallel-processing section on the basis of whether or not information indicating a start or end of a parallel-processing section is inserted into the parallel-processing program. Collecting the information for determining a clock frequency of the core in the determined parallel-processing section according to each core may include: determining whether the determined parallel-processing section is a first executed section; when it is determined that the determined parallel-processing section is a first executed section, storing information for identifying a program code currently executed in the determined parallel-processing section; and measuring an occupation rate of an idle section in the determined parallel-processing section. Storing the information for identifying a program code currently executed in the determined parallel-processing section may include storing a code region identification (ID) of the currently executed program code and a current time. Determining the clock frequency of the core on the basis of the collected information may include determining the clock frequency of the core on the basis of the occupation rate of the idle section collected according to each core. The method may further include: requesting setting of the determined clock frequency of the core; releasing a clock frequency currently set for the core; and setting the determined clock frequency for the core. The method may further include, when the core for which setting of the determined clock frequency is requested is occupied by an application other than an application corresponding to the parallel-processing program, setting a clock frequency for the core in consideration of the clock frequency currently set for the core and the determined clock frequency. The method may further include storing a number of cores currently allocated to a master process ID of the parallel-processing program and core IDs.

In other example embodiments, a program for executing a method of managing power of a multi-core processor is recorded in a recording medium, and performs: determining a parallel-processing section on the basis of information included in a parallel-processing program; collecting information for determining a clock frequency of a core in the determined parallel-processing section according to each core; and determining the clock frequency of the core on the basis of the collected information.

In still other example embodiments, a multi-core processor system includes: a controller configured to determine a parallel-processing section on the basis of information included in a parallel-processing program, collect information for determining a clock frequency of at least one core in the determined parallel-processing section, and determine the clock frequency of the core on the basis of the determined collected information; and a dynamic voltage frequency scaling (DVFS) unit configured to change a clock frequency of a corresponding core among the at least one core on the basis of the determined clock frequency of the core. The controller may determine the parallel-processing section on the basis of whether or not information indicating a start or end of the parallel-processing section is inserted into the parallel-processing program. When the determined parallel-processing section is a first executed section, the controller may store information for identifying a program code currently executed in the determined parallel-processing section and measure an occupation rate of an idle section in the determined parallel-processing section. The controller may store a code region ID of the currently executed program code and a current time to identify the program code currently executed in the determined parallel-processing section. The controller may determine the clock frequency of the core on the basis of the occupation rate of an idle section collected according to each core. The controller may release a clock frequency currently set for the core and then provide a control signal for setting the determined clock frequency for a corresponding core to the DVFS unit. The controller may store a number of cores currently allocated to a master process ID of the parallel-processing program and core IDs.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Figure 1:
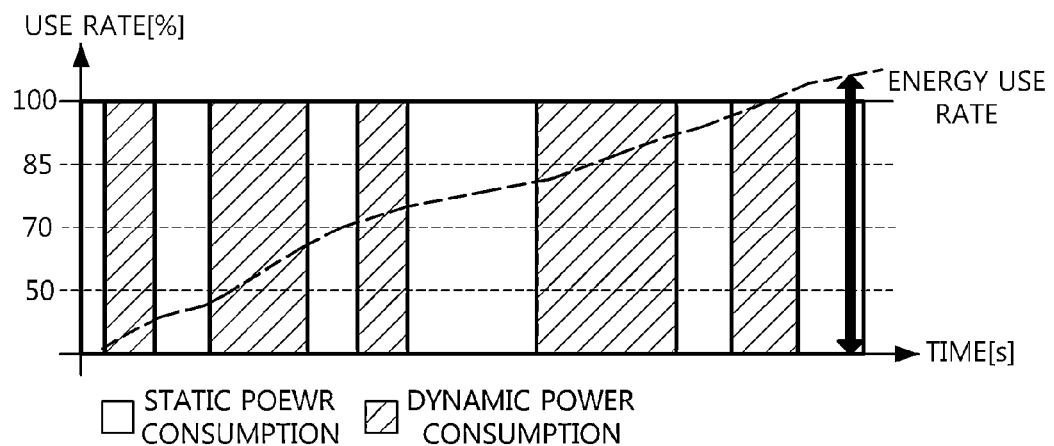
FIG. 1 is a graph illustrating power consumption when power of a processor is not managed.
Figure 2:
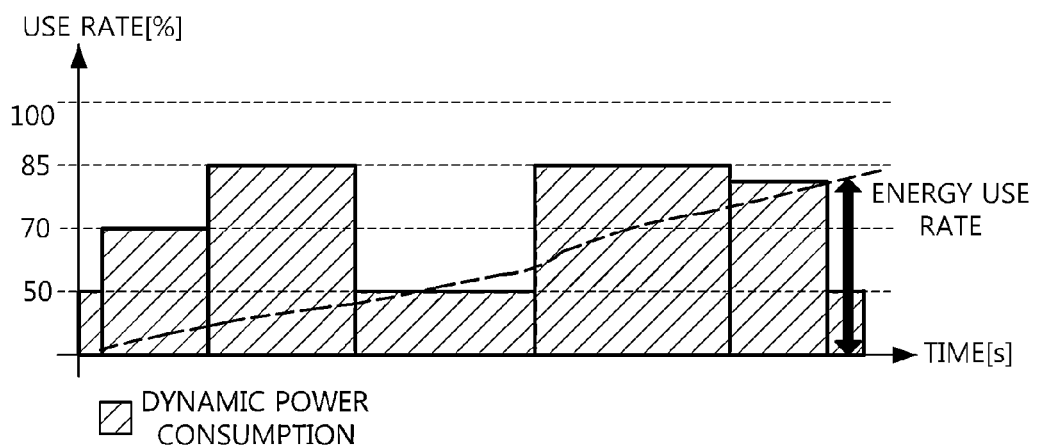
FIG. 2 is a graph illustrating a case in which power of a processor is managed to prevent unnecessary power consumption.
Figure 3:
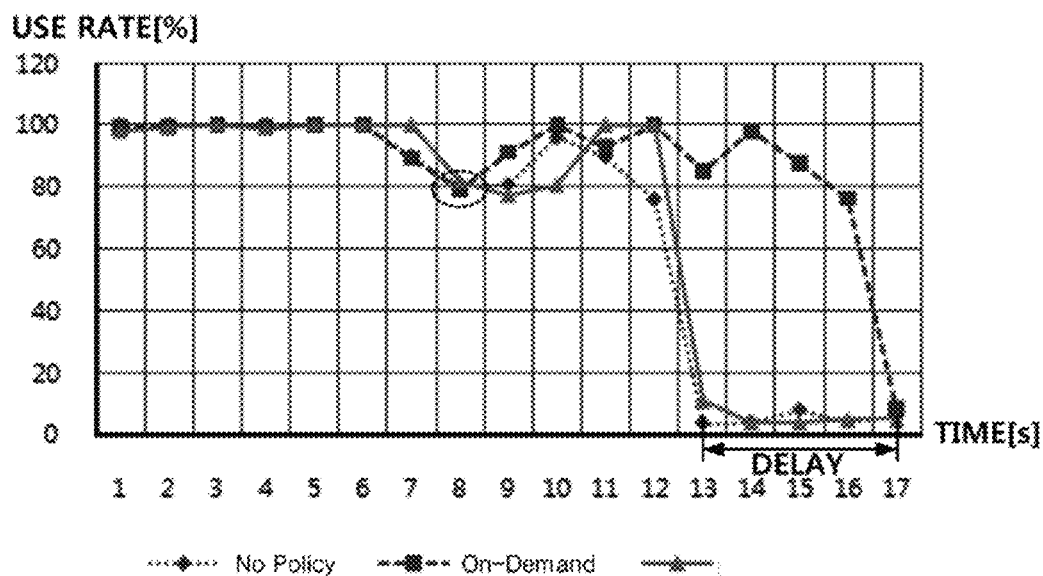
FIG. 3 is a graph showing the result of performing power management using a conventional power management method.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In example embodiments of the present invention, it is assumed that a parallel-processing programming model is used to manage power of a multi-core processor. Here, the parallel-processing programming model includes information indicating a parallel-processing section in a program (e.g., a library function related to parallel processing). For example, in the parallel-processing programming model, a compiler may automatically insert a code for providing information on a parallel-processing section and the number of generated processes to the kernel into a parallel-processing program code while compiling the parallel-processing program code, and when an application is executed in real time, the code automatically inserted by the compiler may be executed to provide the number of generated processes to the kernel and request control from the kernel.

Figure 4:
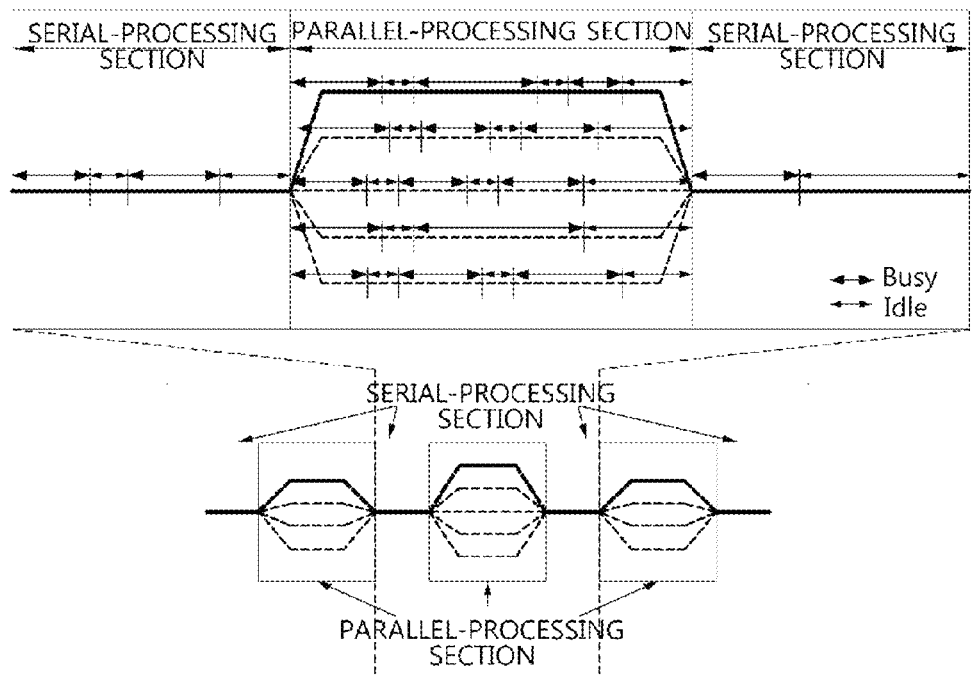
FIG. 4 is a conceptual diagram for illustrating a method of managing power of a multi-core processor according to an example embodiment.

FIG. 4 is a conceptual diagram for illustrating a method of managing power of a multi-core processor according to an example embodiment, showing the number of processes (or threads) generated when the parallel-processing programming model is employed and rates of resources of respective cores occupied by processes of an application.

Referring to FIG. 4, the parallel-processing programming model is analyzed on the assumption that only one application is executed. There are a parallel-processing section in which processes are processed in parallel, and a serial-processing section in which processes are processed in series. In each of the parallel-processing section and serial-processing section, busy sections corresponding to a dynamic power consuming state and idle sections corresponding to a static power consuming state are mixed.

Thus, to minimize power consumption, a deadline, or the process end time of each of the parallel-processing section and the serial-processing section, needs to be set, and idle sections included in each section need to be minimized.

In other words, when the total execution time of each of the parallel-processing section and the serial-processing section is set as one deadline and a rate of the busy sections in the execution time of the parallel-processing section or the serial-processing section is reflected in the maximum frequency of a core, it is possible to minimize power consumption while maintaining quality of service (QoS).

Figure 5:
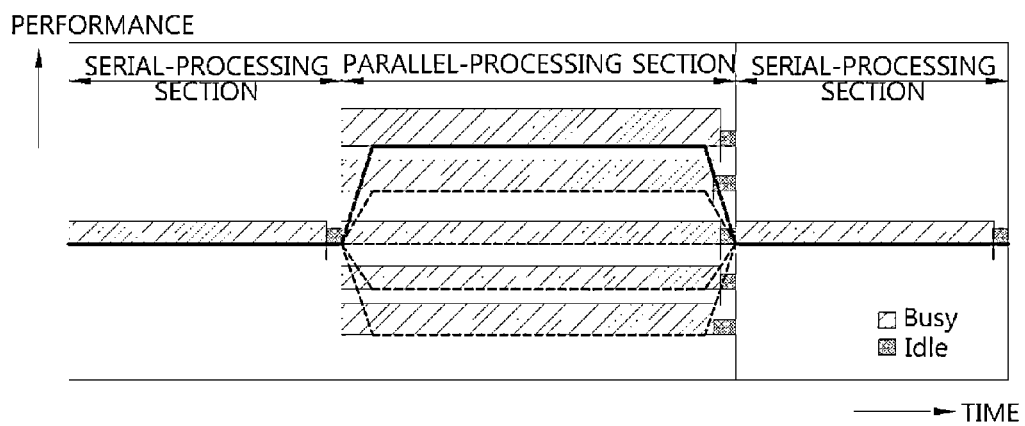
FIG. 5 is a conceptual diagram showing the result of employing a method of managing power of a multi-core processor according to an example embodiment.

FIG. 5 is a conceptual diagram showing the result of employing a method of managing power of a multi-core processor according to an example embodiment. In FIG. 5, an abscissa denotes time, and an ordinate denotes performance.

FIG. 5 shows a case in which the total execution time of each of a parallel-processing section and a serial-processing section is set as one deadline, and a frequency and voltage are set for each core to minimize an idle section in each processing section.

In FIG. 4, busy sections and idle sections are mixed in each of the parallel-processing section and the serial-processing section, and unnecessary power is consumed in the idle sections. On the other hand, in FIG. 5, the deadline of a process is set in each processing section, and a frequency and voltage level are set for each core according to the set deadline of the process. Thus, the idle section of each processing section is minimized, and it is possible to minimize unnecessary power consumption while maintaining QoS.

Figure 6:
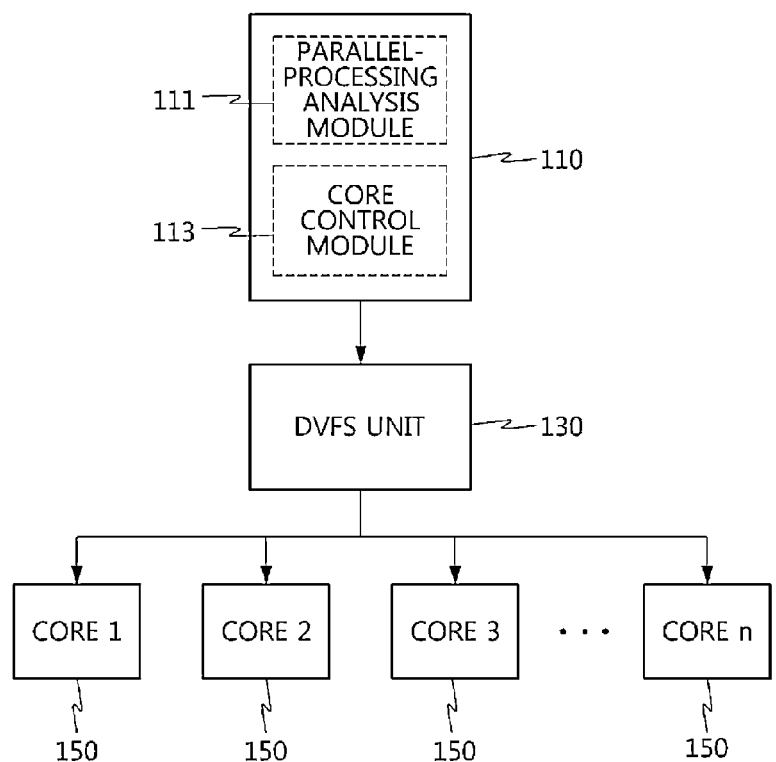
FIG. 6 is a block diagram of a multi-core processor system performing a power management method according to an example embodiment.

FIG. 6 is a block diagram of a multi-core processor system performing a power management method according to an example embodiment.

Referring to FIG. 6, the multi-core processor system according to an example embodiment may include a controller 110, a dynamic voltage frequency scaling (DVFS) unit 130, and a plurality of cores 150.

The controller 110 determines a parallel-processing section and a serial-processing section by analyzing a parallel-processing programming model of an executed application, sets the deadline of each processing section, and then requests performance setting for each core. Also, the controller 110 stores and manages the number of core resources used by each executed application, and processes a request for allocation of a new core made by a predetermined application.

The controller may include a parallel-processing analysis module 111 and a core control module 113 that can be handled as software to perform the above-mentioned functions.

To be specific, the parallel-processing analysis module 111 determines whether a currently executed section is a first executed parallel-processing section on information indicating the start or end of a parallel-processing section included in the program code of a currently executed application, and then stores a code region identification (ID) and a time whereby the program code of the currently executed parallel-processing section can be identified when the currently executed parallel-processing section is determined to be a first executed section.

Subsequently, the parallel-processing analysis module 111 measures the occupation rate of an idle section in the current parallel-processing section according to each core until information indicating the start or end of the next parallel-processing section is obtained, calculates the clock frequency of each core on the basis of the measured occupation rate of the idle section, and requests the core control module 113 to set performance of each core corresponding to the calculated clock frequency of the core.

The parallel-processing analysis module 111 may calculate the clock frequency of each core using Equation 1, and a voltage level corresponding to the clock frequency of each core may be determined according to a predetermined standard.

Clock frequency=Maximum clock frequency×
  Core occupation rate≤Clock level supported by
  DVFS                                                    [Equation 1]

In other words, the parallel-processing analysis module 111 determines the clock frequency of each core by multiplying the maximum clock frequency and the occupation rate of the core as shown in Equation 1, and requests the determined clock frequency to be set as the clock frequency of the core. Here, the calculated clock frequency of each core may be within the range of a clock level that can be supported by the DVFS unit 130.

Also, the parallel-processing analysis module 111 may be configured to request setting of optimum performance for a single core that processes a process of a serial-processing section in the above-described method.

For example, the parallel-processing analysis module 111 may obtain start or end information indicating a serial-processing section from the program code of an application, measure the occupation rate of an idle section in a first executed serial-processing section, and then determine and request performance of a core for processing a process of the serial-processing section in which the same program code is executed on the basis of the measured occupation rate of an idle section.

When a core performance setting request for a predetermined application is generated from the parallel-processing analysis module 111, the core control module 113 generates a control signal for releasing the performance setting of the corresponding core for which performance setting is requested, provides the control signal to the DVFS unit 130, and then provides a control signal for setting performance of the core as requested core performance to the DVFS unit 130. Here, the requested core performance denotes the clock frequency of the core and/or a voltage level corresponding to the clock frequency.

Meanwhile, when the core for which performance setting is requested is occupied by another application, the core control module 113 provides a control signal for summing currently set core performance and newly requested core performance and setting the sum as final core performance to the DVFS unit 130.

Alternatively, when a core performance setting request is generated, the core control module 113 may directly generate a control signal for changing or updating the performance setting of the corresponding core without releasing the performance setting of the core for which performance setting is requested.

When two or more parallelized applications are executed, collision of performance setting requests needs to be prevented for reliable core control. Thus, when a control signal for setting performance of a core is generated, the core control module 113 may store the number of cores currently allocated to the master process (or master thread) ID of an application and the core IDs. Then, when a new core performance setting request is generated, the core control module 113 may control performance of the corresponding core to be set in consideration of the stored master process ID, the number of cores allocated according to the master process ID, and the core IDs.

The DVFS unit 130 adjusts a clock frequency and/or a voltage level provided to a core corresponding to a core performance setting control signal provided by the controller 110 among the cores 150 according to the core performance setting control signal.

Figure 7:
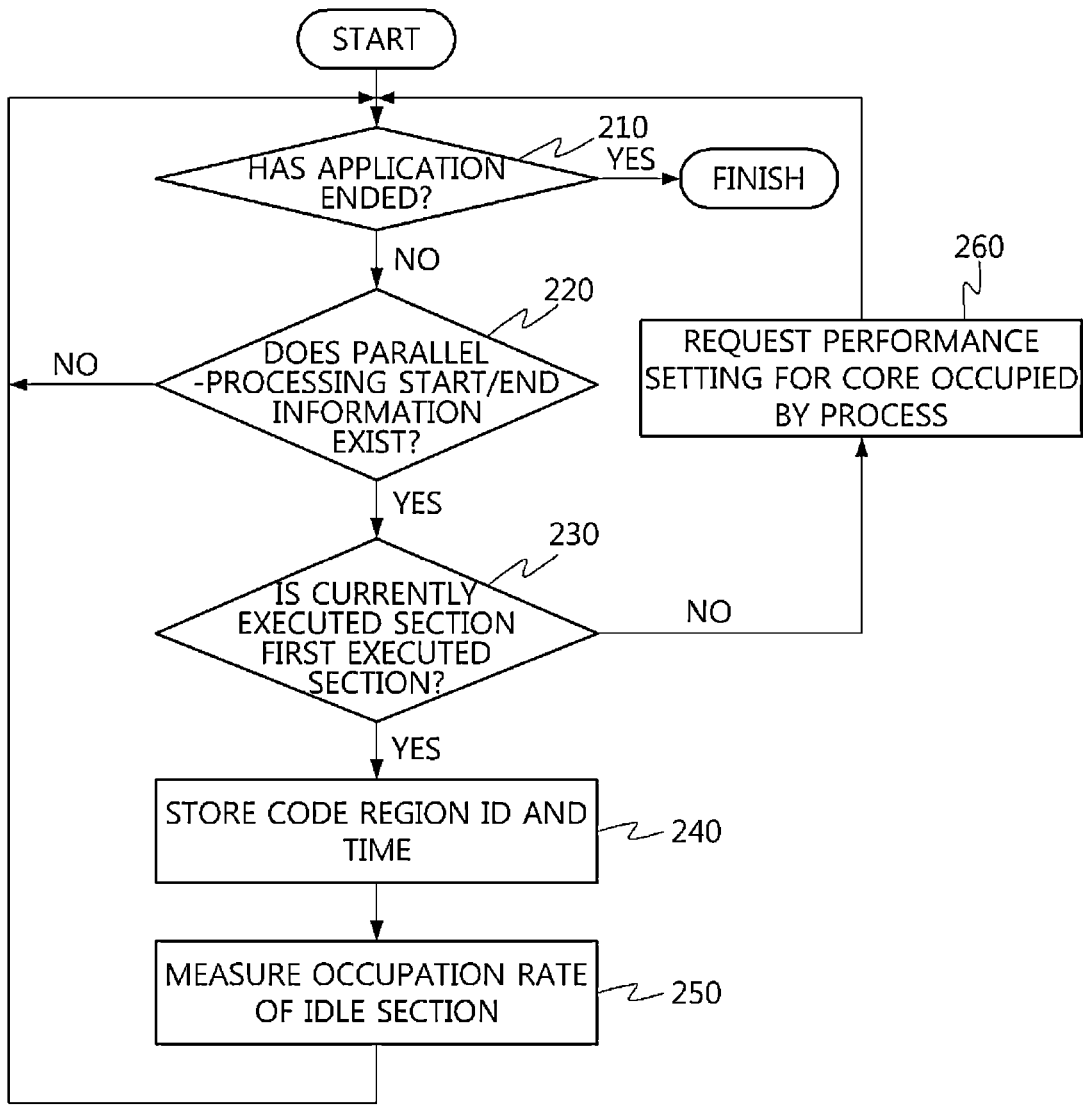
FIG. 7 is a flowchart illustrating a method of managing power of a multi-core processor according to an example embodiment.

FIG. 7 is a flowchart illustrating a method of managing power of a multi-core processor according to an example embodiment, which can be performed by the parallel-processing analysis module 111 of the controller 110 shown in FIG. 6.

Referring to FIG. 7, the parallel-processing analysis module determines whether or not a currently executed application has ended (step 210). When it is determined that the application has not ended but is being executed, the parallel-processing analysis module determines whether information indicating the start or end of a parallel-processing section is in the program code of the executed application (step 220).

At this time, the parallel-processing analysis module may determine whether or not information indicating the start or end of a parallel-processing section is in the program code on the basis of a code (e.g., a library function related to parallel processing) that is inserted into a parallel-processing program of applications and indicates the start or end of a parallel-processing section.

When it is determined in step 220 that information indicating the start or end of a parallel-processing section is in the program code, the parallel-processing analysis module determines whether a currently executed section is a first executed parallel-processing section (step 230). When it is determined that the currently executed section is a first executed parallel-processing section, the parallel-processing analysis module stores a code region ID and a time whereby a program code of the current parallel-processing section can be identified to determine the deadlines of processes (step 240).

In step 240, the code region ID is allocated to the start and end points of the parallel-processing section to determine whether or not the program code at the same position is repeatedly executed by a predetermined application. In other words, only when a program code corresponding to a predetermined parallel-processing section of an application is executed for the first time, is performance of a core occupied by the corresponding process measured. When the program code is executed afterwards, optimum performance (i.e., a clock frequency and/or a voltage level) to be allocated to the corresponding core is determined on the basis of the performance measured when the same program code is executed for the first time.

Subsequently, the parallel-processing analysis module measures the occupation rate of an idle section in the current parallel-processing section until information indicating the start or end of the next parallel-processing section is obtained (step 250). At this time, the occupation rate of the idle section may be measured according to respective cores processing the processes of the parallel-processing section.

Meanwhile, when it is determined in step 230 that the current section is not a first executed section, the parallel-processing analysis module requests performance setting for cores occupied by processes on the basis of the information previously collected in steps 240 and 250 (step 260). At this time, the parallel-processing analysis module may calculate the clock frequency of each core by Equation 1, and a voltage level corresponding to the clock frequency of each core may be determined according to a predetermined standard.

In the method of managing power of a multi-core processor according to an example embodiment illustrated in FIG. 7, performance setting for a plurality of cores that process a plurality of processes in a parallel-processing section on the basis of the parallel-processing programming model has been described as an example. However, in another example embodiment, optimum performance setting may also be requested for a single core that processes a process of a serial-processing section using the above-described method.

For example, in step 220 of FIG. 7, the controller may determine whether or not information indicating the start or end of a serial-processing section exists, measure the occupation rate of an idle section in a first executed serial-processing section, and then determine and request performance of a core for processing a process of the serial-processing section in which the same program code is executed on the basis of the measured occupation rate of an idle section.

Figure 8:
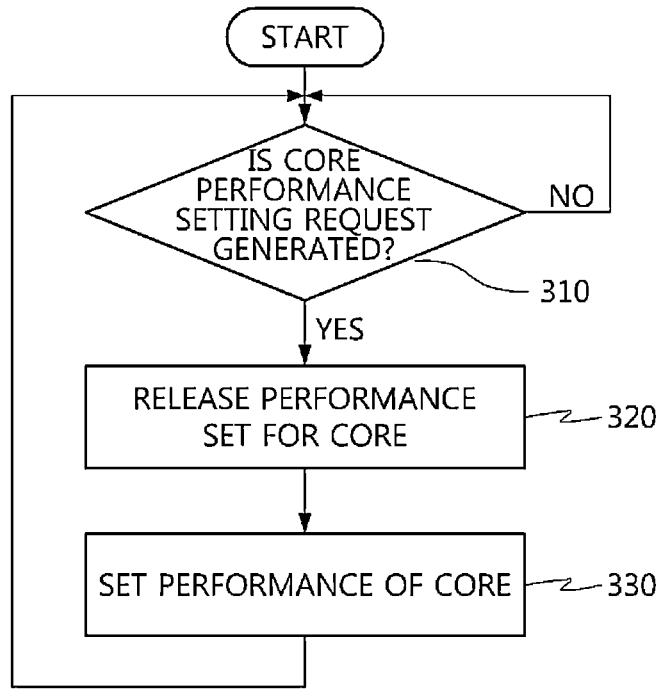
FIG. 8 is a flowchart illustrating a method of managing power of a multi-core processor according to an example embodiment.

FIG. 8 is a flowchart illustrating a method of managing power of a multi-core processor according to an example embodiment, which can be performed by the core control module 113 of the controller 110 shown in FIG. 6.

Referring to FIG. 8, the core control module determines whether a core performance setting request for a predetermined application is generated (step 310). When it is determined that a core performance (i.e., the clock frequency of a core) setting request for a predetermined application is generated, the core control module generates a control signal for releasing the performance setting of the corresponding core for which performance setting is requested (step 320). At this time, the core performance setting request for a predetermined application may be provided by the parallel-processing analysis module 111 of the controller 110 shown in FIG. 6.

Subsequently, the core control module generates a control signal for setting performance of the core as requested core performance (step 330). Here, the requested core performance denotes the clock frequency of the core and/or a voltage level corresponding to the clock frequency.

Meanwhile, when the core for which performance setting is requested in step 330 is occupied by another application, the core control module generates a control signal for summing currently set core performance and newly requested core performance and setting the sum as final core performance.

In the method of managing power of a multi-core processor according to an example embodiment illustrated in FIG. 8, the core control module releases the performance setting of the corresponding core for which performance setting is requested in step 320, and then generates the control signal for setting performance of the core in step 330. However, in another example embodiment, when a core performance setting request is generated, the core control module may directly generate a control signal for setting performance of the corresponding core without performing step 320.

Also, when two or more parallelized applications are executed, collision of performance setting requests needs to be prevented for reliable core control. Thus, in the method of managing power of a multi-core processor illustrated in FIG. 8, the core control module may store the number of cores currently allocated to the master process (or master thread) ID of a currently executed parallel-processing program and the core IDs when generating the control signal for setting performance of the corresponding core in step 330.

In the above-described method of managing power of a multi-core processor and the above-described multi-core processor system performing the method, a parallel-processing section is determined on the basis of information included in a parallel-processing program, the occupation rate of an idle section in the determined parallel-processing section is measured according to each core, and then the clock frequency of each core is set to minimize the idle section in consideration of the measured idle section.

Accordingly, the idle section can be minimized in the parallel-processing section and a serial-processing section, and unnecessary power consumption can be prevented. Also, since an optimum clock frequency is allocated in consideration of the deadline of a process allocated to each core, it is possible to satisfy QoS related to execution of an application.

While the example embodiments of the present invention and their advantages have been described in detail, it should be understood that various changes, substitutions and alterations may be made herein without departing from the scope of the invention.

What is claimed is:

1. A method of managing power of a multi-core processor having at least one core, comprising:
   determining a parallel-processing section on the basis of information included in a parallel- processing program;
   collecting information for determining a clock frequency of the core in the determined parallel-processing section according to each core; and
   determining the clock frequency of the core on the basis of the collected information,
   wherein collecting the information for determining a clock frequency of the core in the determined parallel-processing section according to each core includes:
   determining whether the determined parallel-processing section is a first executed section;
   when it is determined that the determined parallel-processing section is a first executed section, storing information for identifying a program code currently executed in the determined parallel-processing section; and
   measuring an occupation rate of an idle section in the determined parallel-processing section.

2. The method of claim 1, wherein storing the information for identifying a program code currently executed in the determined parallel-processing section includes storing a code region identification (ID) of the currently executed program code and a current time.

3. The method of claim 1, wherein determining the clock frequency of the core on the basis of the collected information includes determining the clock frequency of the core on the basis of the occupation rate of the idle section collected according to each core.

4. A method of managing power of a multi-core processor having at least one core, comprising:
- determining a parallel-processing section on the basis of information included in a parallel-processing program;
- collecting information for determining a clock frequency of the core in the determined parallel-processing section according to each core; and
- determining the clock frequency of the core on the basis of the collected information;
- requesting setting of the determined clock frequency of the core;
- releasing a clock frequency currently set for the core;
- setting the determined clock frequency for the core; and
- when the core for which setting of the clock frequency is requested is occupied by an application other than an application corresponding to the parallel-processing program, setting a clock frequency for the core in consideration of the clock frequency currently set for the core and the determined clock frequency.

5. A method of managing power of a multi-core processor having at least one core, comprising:
- determining a parallel-processing section on the basis of information included in a parallel-processing program;
- collecting information for determining a clock frequency of the core in the determined parallel-processing section according to each core;
- determining the clock frequency of the core on the basis of the collected information; and
- storing a number of cores currently allocated to a master process identification (ID) of the parallel-processing program and core IDs.

6. A multi-core processor system including at least one core, comprising:
- a controller configured to determine a parallel-processing section on the basis of information included in a parallel-processing program, collect information for determining a clock frequency of the at least one core in the determined parallel-processing section, determine the clock frequency of the at least one core on the basis of the determined collected information, and provides a control signal for changing a clock frequency on the basis of the determined clock frequency; and
- a dynamic voltage frequency scaling (DVFS) unit configured to change a clock frequency of a corresponding core among the at least one core on the basis of the control signal provided by the controller,
- wherein when the determined parallel-processing section is a first executed section, the controller stores information for identifying a program code currently executed in the determined parallel-processing section and measures an occupation rate of an idle section in the determined parallel-processing section.

7. The multi-core processor system of claim 6, wherein the controller stores a code region identification (ID) of the currently executed program code and a current time to identify the program code currently executed in the determined parallel-processing section.

8. The multi-core processor system of claim 6, wherein the controller determines the clock frequency of the core on the basis of the occupation rate of an idle section collected according to each core.

9. The multi-core processor system of claim 6, wherein the controller stores a number of cores currently allocated to a master process identification (ID) of the parallel-processing program and core IDs.

* * * * *